United States Patent [19]

Kakuta et al.

[11] Patent Number: 5,436,055
[45] Date of Patent: Jul. 25, 1995

[54] MAGNETIC RECORDING MEDIUM AND MAGNETIC TAPE CASSETTE MOUNTED WITH THE MAGNETIC RECORDING MEDIUM

[75] Inventors: Takeshi Kakuta; Shinji Saito; Kazuo Kato; Noburo Hibino, all of Kanagawa, Japan

[73] Assignee: Fuji Photo Film Co., Ltd., Kanagawa, Japan

[21] Appl. No.: 37,396

[22] Filed: Mar. 26, 1993

[30] Foreign Application Priority Data

Mar. 27, 1992 [JP] Japan .................. 4-070965

[51] Int. Cl.⁶ .......................... B32B 3/10; G11B 5/66; G11B 15/00
[52] U.S. Cl. .................... 428/141; 428/323; 428/328; 428/329; 428/331; 428/694 B; 428/694 BR; 428/694 BN; 428/694 BS; 428/694 BM; 428/694 SG; 360/88; 360/90; 360/93; 360/134
[58] Field of Search ...... 428/694 B, 694 BR, 694 BN, 428/694 BM, 694 SG, 900, 694 BS, 141, 323, 328, 329, 331, 928; 360/88, 90, 93, 134

[56] References Cited

U.S. PATENT DOCUMENTS

| | | | |
|---|---|---|---|
| 4,348,446 | 9/1982 | Mitsuishi et al. | 428/148 |
| 4,619,869 | 10/1986 | Kiriyama et al. | 428/480 |
| 4,720,412 | 1/1988 | Katoh et al. | 428/141 |
| 4,732,799 | 3/1988 | Sakamoto et al. | 428/141 |
| 4,772,522 | 9/1988 | Kubota | 428/328 |
| 4,818,581 | 4/1989 | Katoh et al. | 428/143 |
| 4,910,068 | 3/1990 | Takagi et al. | 428/141 |
| 5,085,915 | 2/1992 | Taga et al. | 428/141 |
| 5,324,582 | 6/1994 | Goto | 428/323 |

Primary Examiner—L. Kiliman
Attorney, Agent, or Firm—Sughrue, Mion, Zinn, Macpeak & Seas

[57] ABSTRACT

A magnetic recording medium and a magnetic tape cassette are disclosed, comprising a non-magnetic support having formed on one surface only thereof at least two layers including a lower layer and an upper magnetic layer formed thereon, wherein the surface electric resistance (Rs) of the surface of the magnetic layer of said magnetic recording medium is $10^9$ Ω/sq or less, the non-magnetic support contains at least three different kinds of particles which vary from each other in at least one property of mean particle diameter and Mohs' hardness, and the opposite surface of the magnetic recording medium comprises the rear surface of the nonmagnetic support having at least 1,000 projections having a height of from 200 nm to 400 nm per 0.1 mm², but with the provisos that not more than 1,000 projections are present having a height of from 400 nm to 700 nm per 0.1 mm² and not more than 50 projections are present having a height of 700 nm or more per 0.1 mm².

6 Claims, 1 Drawing Sheet

U.S. Patent   July 25, 1995   5,436,055

MAGNETIC RECORDING MEDIUM AND MAGNETIC TAPE CASSETTE MOUNTED WITH THE MAGNETIC RECORDING MEDIUM

FIELD OF THE INVENTION

The present invention relates to a magnetic recording medium and, particularly, to a magnetic recording medium which is excellent in electromagnetic properties and durability. More specifically, the present invention relates to a magnetic recording medium forming less abrasions and less scratched particles during running of the magnetic tape, and, conversely, scratched particles and dust are reluctant to attach thereto to thereby provide significantly reduced drop out.

Also, the present invention relates to a magnetic tape cassette loaded with the magnetic recording medium of the present invention.

BACKGROUND OF THE INVENTION

Recently, with advancements in magnetic recording, a higher image quality and a higher tone quality have been demanded. For meeting this demand, proposals have been pursued including fining the particle size of a ferromagnetic particle for magnetic recording media and increasing the recording density of the magnetic recording media. Also, with the increase in the demand for and use of magnetic recording media, it nonetheless has been required to produce the magnetic recording media at an even more competitive cost.

As one technique, the employment of a double layer (i.e., a multi-layer) type magnetic recording medium is known. The double layer is advantageous for increasing high-density recording while balancing other properties since suitable ferromagnetic particles can be used for imparting high image quality characteristics to the upper layer and high tone quality characteristics to the lower layer. Also, the employment of the double layer type magnetic recording medium has another salutary feature that the magnetic recording medium can be produced at a low cost since proper materials can be used for each layer. At present, a method of improving the surface property of the surface of the magnetic layer, in general, is considered to be effective to increase the electromagnetic properties.

On the other hand, the electromagnetic properties of a magnetic recording medium are the properties which shall be evaluated on the assumption that the magnetic recording medium has a good running performance above a prescribed level. Hence, in a magnetic recording medium, for ensuring the good running performance, it is necessary that the friction coefficient of the magnetic layer surface and the back layer surface is relatively small.

Accordingly, at present, a magnetic recording medium is required to have all of (1) excellent electromagnetic properties, (2) an excellent running durability, and (3) excellent productivity.

For attaining the foregoing requirement (1), it is necessary to smoothen the surface of the magnetic layer as smooth as possible. For this purpose, it is required that the surface of the base (support) at the side of coating the magnetic layer is very smooth. In particular, in the case of the magnetic layer of the double layer structure, the surface property of the 1st magnetic layer (hereinafter, referred to as a lower layer) determines the surface property of the whole recording tape. Hence, the surface property of the base support, which gives a large influence on the surface property of the lower layer is likewise important and is required to be smooth.

Then, for improving the running durability, which is the 2nd requirement mentioned above, it is necessary to lower the friction coefficient of the surface of the magnetic layer and the surface of the backing layer. Usually, the running property of a magnetic recording tape is determined by the sliding property between the surface of the magnetic layer of the magnetic recording tape and a head, cylinders, etc., and the sliding property between the back surface of the magnetic recording tape and poles, guides, etc., in a magnetic tape deck. If the friction coefficient is high, there occur problems of stick slip, sticking, and so forth. Thus, for lowering the friction coefficient of the surface of the magnetic layer, it is known to add a lubricant into or on the magnetic layer or topically applying a lubricant onto the surface of the magnetic layer.

Also, as to the back surface, if the back surface of the support, as is, of a magnetic recording tape is simply slided with a guide and a pole, a good friction coefficient is not obtained. Thus, it is known to increase the unevenness of the surface of the back surface and to form a back coat layer thereon. However, if the unevenness of the surface of the back layer is too large, the roughness is sometimes transferred onto the surface of the magnetic layer when the magnetic recording tape is wound to deteriorate the electromagnetic properties of the magnetic recording tape. Accordingly, it is necessary that the surface of the back layer does not have a surface roughness of an extent of being transferred onto the surface of the magnetic layer, but instead has a proper surface roughness capable of ensuring the good running property.

Furthermore, as to the excellent productivity which is the 3rd above mentioned requirement, it is required to obtain a good running durability by not only employing simply a double layer for the magnetic layer, but, also, without forming a back layer.

Previously, JP-A-63-175222 (the term "JP-A" as used herein means an "unexamined published Japanese patent application") proposes a base for a magnetic recording medium, which can prevent the occurrence of the deformation of projections of the base, keep the friction coefficient of the base at a constant, and does not deteriorate the electromagnetic properties of the magnetic recording medium by using two kinds of spherical silicas as the fillers for the base and making the state of the projections of the fillers denser than a certain extent.

However, the surface of the foregoing base is not sufficiently smooth since the base contains two kinds of fillers, each having a different size. Hence, when a magnetic layer of a double layer structure is formed on the base, the smoothness of the lower magnetic layer is insufficient and the unevenness of the lower layer is amplified to form a rough magnetic layer as the upper layer. Thus, the electromagnetic properties are not desirably improved at the surface side of the magnetic layer and also the large fillers exposed locally are scratched at the back surface side of the base, whereby the durability is liable to deteriorate.

Accordingly, the back surface of the foregoing base can not be used unless provided with a back coating layer.

Thus, for the purpose of providing a magnetic recording medium having a high productivity, wherein the base surface is smooth and the magnetic layer formed thereon has excellent electromagnetic properties, as well as the magnetic recording medium has a good running durability at the back surface without the need of a back coating layer, one proposal is a magnetic recording medium comprising a polyethylene terephthalate base having formed on the surface thereof a 1st magnetic layer and a 2nd magnetic layer, in this order, wherein the polyethylene terephthalate base contains inert inorganic particles having a particle size distribution of a mean particle size of from 0.5 to 0.7 μm and a standard deviation of not larger than 0.1 μm, the center line average roughness (Ra) of the surface of the polyethylene terephthalate base is not more than 16 nm, and the number of projections having a projection density (Ds) of at least 0.7 μm is at least 6,000/mm$^2$ (i.e., at least 60 per 0.1 mm$^2$), as disclosed in JP-A-2-193313.

However, recently, the degree of a high image quality and a high tone quality required has been ever increased. With the increase demands, the improvement of the electromagnetic properties, in particular, fining of the particle size of a ferromagnetic particle and the increase of high-density recording have been considered. Further, it is required to concomitantly lower the occurrence of noise and increase C/N by smoothening the surface of the magnetic recording tape. However, for achieving such requirements, sufficiently satisfactory results are not assurable by the foregoing proposal.

If the surface of a magnetic recording medium becomes smooth, the friction coefficient is increased to reduce the running durability. On the other hand, if the friction coefficient of a magnetic recording medium is large, the magnetic layer and the back surface thereof are damaged by repeated running to form abrasions and scratched particles which attach to the magnetic layer to cause drop out. Also, if the electrostatically charging property of a magnetic recording tape is large, dust and scratched particles are liable to attach to the surface of the magnetic layer during running of the tape to cause drop out. For obtaining a stable running property and preventing the increase of drop out by repeated use of a magnetic recording tape, it is necessary that the friction coefficient of the magnetic recording layer and the back surface is low and further damage generated by sliding with the parts in a tape cassette and guide pins in a tape deck is prevented, and that the charging property of the magnetic recording tape is low.

For these requirements, it has hitherto been practiced to roughen the surface property of the back surface of a magnetic recording medium for purposes of lowering the friction coefficient of the back surface and to incorporate carbon black into the magnetic layer for purposes of lowering the charging property thereof.

However, when the back surface is roughened, the roughness on the back surface is transferred onto the surface of the magnetic layer in the case of winding the magnetic recording tape to deteriorate the surface property of the magnetic layer and to lower the electromagnetic properties of the magnetic recording tape. Also, since carbon black is a non-magnetic particle, if a large amount of carbon black is incorporated in the magnetic layer, the magnetic characteristics are lowered to reduce the electromagnetic properties. Accordingly, it is difficult to realize both the requirement for lowering the electromagnetic properties and the friction coefficient and for lowering the charging property.

As a means for realizing both the requirements, it is proposed to form a back coating layer containing carbon black, and so forth, on the surface of the back surface of the support. However, by the foregoing means, the effect of realizing both the above mentioned requirements is insufficient. In particular, there is a problem that such a magnetic recording tape is inferior in sliding property with respect to resin guide pins recently being used in tape cassettes.

SUMMARY OF THE INVENTION

One object of the present invention is to provide a magnetic recording medium which is excellent in electromagnetic properties, has a lower friction coefficient of the back surface, forms less abrasions and scratched particles during repeated running, and has a low charging property of the tape, whereby the occurrence of drop out is reduced.

In particular, another object of the present invention is to provide a magnetic tape cassette displaying a good running property by loading the foregoing magnetic recording tape of the present invention in a tape cassette equipped with resin guides.

That is, according to one embodiment of the present invention, a magnetic recording medium is provided comprising a non-magnetic support having formed on one surface only thereof a lower layer and an upper magnetic layer formed on the lower layer, wherein the surface electric resistance (Rs) of the magnetic layer side surface of the magnetic recording medium is $10^9$ Ω/sq or less, the non-magnetic support contains at least three different kinds of particles which vary from each other in at least one property of mean particle diameter and Mohs' hardness, and the opposite surface of the magnetic recording medium comprising the rear surface of the non-magnetic support having at least 1,000 projections having a height of from 200 nm to 400 nm per 0.1 mm$^2$ (i.e., this means that the number per 0.1 mm$^2$ of projections having a height of from 200 nm to 400 nm is at least 1,000), but not more than 1,000 projections are present having a height of from 400 nm to 700 nm, per 0.1 mm$^2$ (i.e., this means that the number per 0.1 mm$^2$ of projections having a height of from 400 nm to 700 nm is not more than 1,000) and not more than 50 projections are present having a height of 700 nm or more per 0.1 mm$^2$.

In a preferred embodiment of the foregoing magnetic recording medium of the present invention, the at least three different kinds of particles include (1) formless particles having a mean particle size of from 0.3 to 0.8 μm, (2) granular to spherical particles having a mean particle size of from 0.3 to 0.8 μm, and (3) granular to spherical particles having a mean particle size of not larger than 0.2 μm.

Also, in other preferred embodiment of the magnetic recording medium of the present invention, at least three different kinds of particles include (1) particles having a mean particle size of from 0.3 to 0.8 μm and a Mohs' hardness of from 1 to 5, (2) an inorganic particle having a mean particle size of from 0.3 to 0.8 μm and a Mohs' hardness of at least 6, and (3) an inorganic particle having a mean particle size of not larger than 0.2 μm and a Mohs' hardness of at least 6.

In still other preferred embodiment of the magnetic recording medium of the present invention, the lower layer is a lower magnetic layer containing at least a ferromagnetic particle and a binder or the lower non-magnetic layer containing at least a non-magnetic particle and a binder and the coercive force of the whole magnetic layers of the magnetic recording medium is at least 650 Oe.

Also, in a more preferred embodiment of the magnetic recording medium of the present invention, the above-mentioned particles having the mean particle size of from 0.3 to 0.8 μm and the Mohs' hardness of from 1 to 5 are CaCO₃ particles, the inorganic particles having a particle size of from 0.3 to 0.8 μm and the Mohs' hardness of at least 6 are SiO₂ particles, and the particles having a mean particle size of not larger than 0.2 μm and the Mohs' hardness of at least 6 are Al₂O₃ particles.

Furthermore, according to another aspect of the present invention, a magnetic tape cassette loaded is provided with the magnetic recording medium of the present invention which can yield very excellent effects when loaded in a magnetic tape cassette equipped with tape guides formed of resin material.

DETAILED DESCRIPTION OF THE INVENTION

Figure 1:
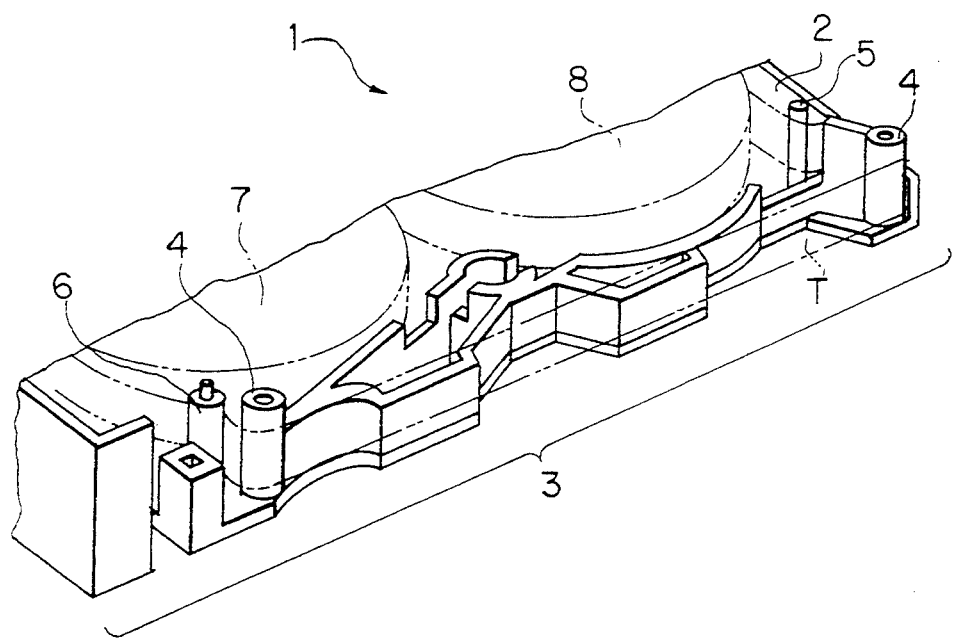
FIG. 1 is a partly open perspective view of the front portion of a video magnetic tape cassette, according to one embodiment of the present invention.

In the magnetic recording medium of the present invention, by using a combination of at least three different kinds of particles each differing in either of the mean particle size or the Mohs' hardness from one another, and the particle form contained in the nonmagnetic support, the specific projection groups formed on the back surface of the non-magnetic support of the magnetic recording medium, the excellent sliding property of the magnetic recording medium with guide members of a tape cassette is ensured. The back surface of the nonmagnetic support does not transfer the surface unevenness onto the surface of the magnetic layer, and also by lowering the surface electric resistance of the entire magnetic recording medium, that is, by lowering the surface electric resistance of the magnetic layer surface to 10⁹ Ω/sq or less, electrostatic charging, which otherwise is liable to form at the back surface side, is prevented and drop out is remarkably reduced.

One of the features of the present invention is in the proviso that the non-magnetic support contains at least three different kinds of particles. One kind of the particles is comprised of so-called formless particles having relatively large particle sizes as a mean particle diameter of from 0.3 to 0.8 μm and being relatively soft with a Mohs' hardness of from 1 to 5. Since the particles are soft and large, they give an effect as a cushion and they do not injure soft materials, such as resin guides employed in a tape cassette or video cassette.

The formless particles mean that each particle has each different shape and are particles lacking a typical or regular form. Typical examples of the formless particles are CaCO₃ particles, CaF₂ particles, CaSO₃ particles, talc particles, organic resin particles, and the like. These particles attain an important role in the view point of not damaging resin guides, and other contacted parts of a tape cassette. The particles have a function of increasing the friction coefficient relative to a hard material, such as metal guides.

The 2nd kind of particles of the present invention have a mean particle diameter of from 0.3 to 0.8 μm, which is same as the mean particle diameter of the foregoing formless particles; however, these 2nd particles are relatively hard as the Mohs' hardness thereof is at least 6. These particles contribute to reduce the friction coefficient of the magnetic recording medium and improve the durability and the running property of the magnetic recording medium. However, since the particles have large particle sizes and are relatively hard, the particles have a drawback of being liable injure contacted parts, for example, resin guides of a tape cassette. However, this drawback can be solved by using together the first kind of particles of soft formless particles having almost the same particle sizes as the hard particles and also by using a granular to spherical form as the form of these hard particles. Practical examples of the 2nd particles are SiO₂ particles, Al₂O₃ particles, SiC particles, and zirconia particles. SiO₂ particles having a form near a pearl shape are particularly preferred.

Furthermore, the 3rd kind of particles of the present invention are fine particles having a mean particle diameter of not larger than 0.2 μm and particles having a relatively hard hardness wherein the Mohs' hardness is at least 6 and having an angular form or a granular to spherical form. These particles have a durability owing to the hard hardness but have an effect of not injuring to the resin guides, etc., since the sizes thereof are relatively small. Practical examples of the particles are particles of Al₂O₃ (α-Al₂O₃, γ-Al₂O₃) and TiO₂ particles.

The particularly preferable particles for the 3rd particle kind are α-Al₂O₃ particles.

It is preferable that the mixing ratio of the three different kinds of particles are as follows. The ratio of the formless particles having a mean particle diameter of from 0.3 to 0.8 μm (particularly from 0.5 to 0.7 μm) and a Mohs' hardness of from 1 to 5 (particularly from 2 to 4) (preferably CaCO₃ particles), the granular to spherical particles having a mean particle diameter of from 0.3 to 0.8 μm (particularly from 0.4 to 0.6 μm) and a Mohs' hardness of at least 6 (particularly from 6 to 8) (preferably SiO₂ particles), and the granular to spherical particles having a mean particle size of not larger than 0.2 μm (particularly not larger than 0.15 μm) and a Mohs' hardness of at least 6 (particularly from 7 to 10) (preferably Al₂O₃) is 5 to 30:0.5 to 3.0:1 to 5 by weight (particularly 5 to 10:1 to 3:1 to 3 by weithgt), respectively.

As described above, the magnetic recording medium has a feature in the surface property of the non-magnetic support corresponding to the back surface and a feature in the layer structure of forming an upper magnetic layer on a lower magnetic layer or a lower nonmagnetic layer.

In the case of a single magnetic layer, if a large amount of carbon black is incorporated in the magnetic layer, the content of a ferromagnetic particle is lowered, whereby the electromagnetic properties are liable to deteriorate. However, by employing a plural or double magnetic layer structure, a sufficient amount of carbon black can be incorporated in the lower layer, and by virtue of the existence of the lower layer per se, a smoother upper magnetic layer is obtained. Also, for forming the plural magnetic layer structure, by employing a conventional simultaneous coating system or a successive wet coating system, the smoothness and productivity of the magnetic recording medium can be further improved.

In the present invention, the electrostatic charging problem, which is liable to occur by improving the running property of the back surface and smoothening the back surface, is solved by lowering the surface electric resistance of the magnetic layer side of the medium.

That is, in the present invention, by using the non-magnetic support containing the at least three different kinds of the particles described herein and having the specific projections in the rear surface of the apparatus described herein, the magnetic recording medium of the present invention has a better running property than a magnetic recording medium having an ordinary back layer and has no drawback of causing abrasions to resin guides as caused by a conventional magnetic recording medium having a back layer.

By forming such a smooth back surface in the magnetic recording medium of the present invention, the charging property is liable to relatively increase. However, the problem can be solved in the present invention by incorporating carbon black in the magnetic layer side, for instance, in the lower magnetic layer or the lower nonmagnetic layer, which have less influence on the electromagnetic properties of the magnetic recording medium. As a result, the surface electric resistance of the magnetic layer surface of the magnetic recording medium is lowered $10^9$ $\Omega$/sq or less.

As a means for lowering the charging property of the magnetic layer, there is a method of lowering the electric resistance of the magnetic layer by adding carbon black into the magnetic layer. However, carbon black is a non-magnetic particle and when the addition amount of carbon black is increased, the magnetic property is lowered and the electromagnetic properties are lowered as described above. On the other hand, in the case of the magnetic layers of a double layer structure, by increasing the addition amount of carbon black in the lower magnetic layer or the lower non-magnetic layer only and limiting the addition amount thereof into the upper magnetic layer to the minimum necessary amount or adding no carbon black to the upper magnetic layer, lowering of the electromagnetic properties can be prevented and at the same time the charging property can be lowered.

As carbon back to be used in the lower magnetic layer of the present invention, examples are furnace black for rubber, thermal black for rubber, carbon black for coloring, acetylene black, and the like. The mean particle diameter of carbon black being used in the present invention is preferably from 5 to 100 m$\mu$, and more preferably from 5 to 50 m$\mu$. If the particle diameter of carbon black is larger than 100 m$\mu$, the effect of lowering the surface electric resistance is insufficient.

Also, the addition amount of carbon black is preferably from 5 to 50% by weight, and more preferably from 10 to 30% by weight to the amount of the ferromagnetic particle in at least one magnetic layer. If the addition amount of carbon black is less than 5% by weight, the effect of lowering the surface electric resistance is insufficient, while if the addition amount is more than 50% by weight, the electromagnetic properties are deteriorated.

These carbon blacks are commercially available as Vulcan XC-72, BP905, and BP800 (trade names, made by Cabot Co., Ltd.), Conductex SC (trade name, made by Columbia Carbon Co., Ltd.), Asahi #50, Asahi #55, Asahi #70, and Asahi #80 (trade names, made by Asahi Carbon Co., Ltd.), and 950B, 3250B, and 650B (trade names, made by Mitsubishi Chemical Corporation).

A typical example of the non-magnetic support being used in the present invention is a polyester film and a polyester can be obtained by polycondensing an aromatic dicarboxylic acid such as terephthalic acid, isophthalic acid, naphthalene-2,6-dicarboxylic acid, etc., or the ester thereof and a glycol such as ethylene glycol, diethylene glycol, tetramethylene glycol, neopentyl glycol, and the like.

The polyester is obtained by directly polycondensing the aromatic dicarboxylic acid and the glycol, or is obtained by ester-exchange reacting an aromatic dicarboxylic acid dialkyl ester and a glycol followed by polycondensation or by polycondensing an aromatic dicarboxylic acid ester.

Specific examples of such a polyester polymer are polyethylene terephthalate and polyethylene naphthalate.

The feature of the polyester film being used as the non-magnetic support in the present invention is that the film has specific numbers of projections each having the specific prescribed height on the surface thereof by adding, particularly preferably, particles of $CaCO_3$, $SiO_2$, and $Al_2O_3$ singly or in combination, during the production of the film.

By the existence of these projections, the durability, the scratching resistance, etc., of the tape are improved.

The particles of $SiO_2$ that can be used in the support are hard and have a Mohs' hardness of at least 8, and, thus, the projections formed by the $SiO_2$ particles have an effect of lowering the friction coefficient of the tape with metal guide pins in a cassette half and metal members in a tape deck. However, the projections are liable to damage resinous guide pins and resin members owing to the hard hardness and because the scratched particles cause drop out. However, when projections formed by particles of $CaCO_3$ exist together with projections formed by particles of $SiO_2$, the hardness of the $CaCO_3$ particles is about 3 Mohs' hardness, the projections of $CaCO_3$ function as a role of cushion material, whereby the projections formed by the $SiO_2$ particles are less likely to damage the resin guide poles and resin members.

Also, by incorporating the $Al_2O_3$ particles having particle sizes smaller than the $SiO_2$ particles, the abrasion resistance of the polyester film itself is improved.

In regard to the projections formed on the surface of the film by the particles of $CaCO_3$ and $SiO_2$, in general, as the heights thereof are high and the numbers thereof are many, the friction coefficient of the tape is lowered and the scratching resistance of the tape is improved, but surface roughness (Ra) of the film is increased and the electromagnetic properties of the magnetic recording tape are deteriorated.

Accordingly, as the result of making various investigations on the relations of the distribution of the foregoing two kinds of projections and the durability and electromagnetic properties of the magnetic recording tape, the inventors have discovered that by forming at least 1,000/0.1 mm$^2$ projections having a height of from 200 to 400 nm and with not more than 1,000/0.1 mm$^2$, and more preferably, not more than 500/0.1 mm$^2$ projeections having a height of from 400 to 700 nm, both the high durability and the excellent electromagnetic properties of the magnetic recording tape are obtained. In this case, it is necessary that the number of the projections having the height of 700 nm or more is not more than 50/0.1 mm$^2$.

The height and the number of the projections can be controlled by controlling the particle sizes and the addition amounts of the $SiO_2$ particles and the $CaCO_3$ particles. The particle diameters of the $SiO_2$ particles and the $CaCO_3$ particles are preferably from 0.3 to 0.8 $\mu$m. If the particle sizes are smaller than 0.3 $\mu$m, projections having a height of at least 200 nm are not obtained, whereby a sufficient durability of the magnetic recording tape is not obtained, while if the particle sizes are larger than 0.8 μm, the number of the projections having a height of at least 400 nm becomes larger than the projections having a height of not higher than 400 nm.

Also, the particle diameters of the $Al_2O_3$ particles are preferably not larger than 0.2 μm, and more particularly not larger than 0.1 μm. If the particle sizes thereof are larger than 0.2 μm, the effect desired for the abrasion resistance of the base film becomes lessened.

The friction coefficient on the surface of the non-magnetic recording support, preferably, a polyester film, of the magnetic recording medium of the present invention is preferably not higher than 0.30.

Also, the polyester film being used in the present invention may be one composed of a biaxially stretched thermoplastic resin film having formed on at least one surface thereof the layer containing the above-described inorganic particles.

In addition, the fact that the supports in the examples of the present invention described hereinafter contain the foregoing inorganic particles can be confirmed by applying an oxygen plasma etching treatment (treatment by a plasma reactor, made by Daiwa Kagaku K.K., for 30 minutes at an oxygen amount of 50 ml/min.) to the film surface, and thereafter, measuring the sizes of the inorganic particles near the surface region of the film, and also carrying out an elemental analysis.

The particle sizes can be measured by a method of photographing the etched surface of the film with a scanning type electron microscope (10,000 magnifications, visual field average) and measuring the particle sizes of the inorganic particles, and the elemental analysis can be carried out by measuring the particles exposed by etching using Type EDAX 9800 (trade name, made by Phillips Petroleum Company).

The magnetic recording medium of the present invention is a magnetic recording tape having no back coating layer and is effective as a standard type vide tape and a high-grade type video tape in video tapes for a VHS type video cassette recorder and a Betamax video cassette recorder.

Usually, the coercive force (Hc) of the magnetic layer is from 650 Oe to 850 Oe and the maximum magnetic flux density (Bm) is preferably from 1,300 gauss to 2,200 gauss.

Since the magnetic recording medium of the present invention has a very smooth back surface and is excellent in the electromagnetic properties, it is particularly effective as a high-grade type of tape product.

The magnetic recording medium of the present invention is loaded, in use, in a magnetic tape cassette wherein the tape running route is formed by fixed guides (tape guides, guide pins) or rotary guide rollers. As the guide members, metal guides or resin guides can be applied. When the guide members are resin guides, the problem of the formation of abrasions does not occur in the case of using the magnetic recording medium of the present invention.

As the metal guides, SUS is preferably used and as the resin guides, POM (polyoxymethylene, e.g., Duracon M207, trade name, made by POLY. PLASTIC, Co., Ltd.), polyacetal, polycarbonate, ABS resins, polyamide, polyester, polysulfone, polyphenylene oxide, and the like, are used.

A preferred embodiment of the present invention is explained by referring to the accompanying drawing.

As shown in FIG. 1, in a video tape cassette 1, tape guides 4, 5, and 6 for guiding running of magnetic tape T while contacting with the magnetic layer surface or the back surface of the magnetic tape T are formed near the left and right sides of the front open portion 3 of the cassette. The relatively thick tape guides 4, and the thin tape guide 5 disposed near a reel 8 of a tape supply side are molded together with a lower half case 2 in a body. Also, the cylindrical tape guide 6 (guide roller) rotatably formed near a reel 7 at a winding side of the tape is composed of a synthetic resin mainly comprising a plastic resin such as POM.

The magnetic recording medium of the present invention can be produced, for example, as follows.

After coating a lower magnetic layer or a lower non-magnetic layer on a non-magnetic support, a magnetic orientation treatment (in the case of coating a lower magnetic layer) and a calendering treatment are applied thereto, then, an upper magnetic layer is coated thereon, and the magnetic orientation treatment and the calendering treatment, as in the foregoing case, are applied to form magnetic layers.

However, a particularly preferable coating method is a so-called wet on wet method (as described in U.S. Pat. No. 4,844,946) of forming an upper magnetic layer simultaneously or successively on a lower magnetic layer or a lower non-magnetic layer while the lower layer is in a wet state.

The magnetic layer of the magnetic recording medium of the present invention is a layer composed of a ferromagnetic particle dispersed in a binder.

There is no particular restriction on the ferromagnetic particle being used in the present invention. Examples of the ferromagnetic particle include known ferromagnetic particles such as the particles of $\gamma$-$Fe_2O_3$, Co-containing $\gamma$-$Fe_2O_3$, $Fe_3O_4$, Co-containing $Fe_3O_4$, $CrO_2$, a Co-Ni-P alloy, an Fe-Co-Ni alloy, and the like.

Furthermore, in the present invention, it is preferable to use an abrasive. There is no particular restriction on the abrasive being used but the abrasive having a Mohs' hardness of at least 6, and preferably at least 8 is used.

Examples of the abrasive being used in this invention include MgO (Mohs' hardness of 6), $Cr_2O_3$ (Mohs' hardness of 8.5), $\alpha$-$Al_2O_3$ (Mohs' hardness of 9), $\gamma$-$Al_2O_3$ (Mohs' hardness of 7 to 8), SiC ($\alpha$ or $\beta$, Mohs' hardness of 9.5), and the like. The particle sizes of the abrasive are preferably from 0.01 to 1.50 μm, and more preferably from 0.10 to 0.80 μm. The content of the abrasive is preferably from 0.5 to 10 parts by weight, and more preferably from 1 to 5 parts by weight per 100 parts by weight of the ferromagnetic particle being used. If necessary, a mixture of abrasives each having a different kind and different particle sizes may be used.

It is preferable that the foregoing abrasive is added to the upper magnetic layer.

The binder solution for preparing the magnetic coating composition being used in the present invention is a binder solution composed of a resin component, a solvent, and further, if necessary, a lubricant, and other conventional additives.

As the resin component, a conventionally known thermoplastic resin, thermosetting resin, reactive resin, or a mixture thereof is used. Examples of the resin component include vinyl chloride copolymers (e.g., a vinyl chloride-vinyl acetate copolymer, a vinyl chloride-vinyl acetate-vinyl alcohol copolymer, a vinyl chloride-vinyl acetate-acrylic acid copolymer, a vinyl chloride-vinylidene chloride copolymer, a vinyl chloride-acrylonitrile copolymer, an ethylene-vinyl acetate copolymer, and a vinyl chloride copolymer having introduced therein a polar group and an epoxy group, such as —COOH, —SO$_3$Na, —OSO$_3$H, —SO$_2$Na, PO$_3$Na$_2$, —OPO$_3$H$_2$, etc.), cellulose derivatives such as a nitrocellulose resin, etc., acrylic resins, polyvinyl acetal resins, polyvinyl butyral resins, epoxy resins, phenoxy resins, and polyurethane series resins (e.g., a polyester polyurethane resin, a polyurethane resin having introduced therein a polar group such as —COOH, —SO$_3$Na, —OSO$_3$Na, —SO$_2$Na, —POOH$_2$, —OPO$_3$Na$_2$, etc.).

Also, in the case of using a hardening agent, a polyisocyanate compound is used. The polyisocyanate compound is selected from those which are commonly used as hardening agent components for polyurethane series resins, and the like.

Furthermore, in the case of carrying out a hardening treatment by an irradiation of electron beams, a compound having a reactive double bond (e.g., urethane acrylate) can be used.

Examples of the solvent being used for the preparation of the magnetic coating composition include ketones such as acetone, methyl ethyl ketone, methyl isobutyl ketone, ethyl isobutyl ketone, cyclohexanone, and the like; esters such as methyl acetate, ethyl acetate, butyl acetate, glycol acetate monoethyl ether, and the like; glycol ethers such as ether, glycol dimethyl ether, dioxane, and the like; aromatic hydrocarbons such as benzene, toluene, xylene, and the like; and chlorinated hydrocarbons such as methylene chloride, ethylene chloride, carbon tetrachloride, chloroform, ethylenechlorohydrin, dichlorobenzene, and the like.

These solvents can be used singly or as a mixture thereof.

A particularly preferred solvent is a polar solvent such as ketones and a primary solvent containing a polar solvent additive.

At the preparation of the magnetic coating composition, the ferromagnetic particle and binder solution are uniformly kneaded and dispersed. For the steps of kneading and dispersing, a method of pre-dispersing these materials using a two-roll mill, a three-roll mill, an open kneader, a press kneader, a continuous kneader, and the like, and then dispersing using a sand grinder, a ball mill, and the like, is generally utilized.

In the present invention, the magnetic coating composition may, as a matter of course, contain various kinds of additives such as a lubricant, a dispersing agent, and so forth, according to the purpose desired, as in a conventional technique.

For coating the magnetic coating composition, an air doctor coating method, a blade coating method, a rod coating method, an extrusion coating method, an air knife coating method, a squeeze coating method, an immersion coating method, a reverse roll coating method, a transfer roll coating method, a gravure coating method, a kiss coating method, a spray coating method, a spin coating method, and the like, can be utilized.

The magnetic recording medium of the present invention was described above mainly as a double layer system but so far as the magnetic layers contain the two layers each having the above-described properties, the number of magnetic layers can be two, three or more layers in the magnetic recording medium of the present invention.

In the present invention, the lower layer need not be a magnetic layer. That is, the lower layer may be a non-magnetic layer having at least a non-magnetic particle dispersed in a binder.

As the non-magnetic particle suitable for the lower non-magnetic layer, the particles of TiO$_2$, Al$_2$O$_3$, α-Fe$_2$O$_3$, carbon black, or a mixture thereof can be used.

The present invention is described more practically by the following examples. In addition, all parts in these examples are by weight.

| Coating Composition for Lower Layer: | |
|---|---|
| Cobalt-Modified Magnetic Particle (Hc: 690 Oe, Sb$_{bet}$: 30 m$^2$/g) | 100 parts |
| Vinyl Chloride Series Resin ("400 × 110 A", made by Nippon Zeon Co., Ltd., containing carboxyl group) | 10 parts |
| Polyurethane (C-7209, trade name, made by Dainippon Ink And Chemicals, Inc.) | 5 parts |
| Polyisocyanate Compound (Coronate L, trade name, made by Nippon Polyurethane Co., Ltd.) | 10 parts |
| Carbon Black (Conductex SC, trade name, made by Columbia Carbon Co., Ltd.) | 15 parts |
| Stearic Acid (industrial use) | 1 part |
| Sec-Butyl Stearate | 1 part |
| Methyl Ethyl Ketone | 200 parts |
| Coating Composition for Upper Layer: | |
| Cobalt-Modified Magnetic Particle (Hc: 760 Oe, Sb$_{bet}$: 40 m$^2$/g) | 100 parts |
| Vinyl Chloride Series Resin ("400 × 110 A", trade name, made by Nippon Zeon Co., Ltd.) | 10 parts |
| Polyurethane (C-7209, trade name, made by Dainippon Ink And Chemicals, Inc.) | 5 parts |
| Polyisocyanate Compound (Coronate, trade name, made by Nippon Polyurethane Co., Ltd.) | 10 parts |
| Carbon Black | 1 part |
| Stearic Acid (industrial use) | 1 part |
| Sec-Butyl Stearate | 1 part |
| Methyl Ethyl Ketone | 200 parts |

Each of the foregoing compositions was kneaded by an open kneader and then dispersed by a sand mill to provide a coating composition for a lower layer and a coating composition for an upper layer, respectively.

The coating compositions thus-obtained were coated on the surface of a polyethylene terephthalate film A$_1$, described below, and after applying thereto a magnetic field orientation treatment, drying, and a super calendering treatment, the magnetic recording tape was slit into a video tape of ½ inch width.

Polyethylene terephthalate film A$_1$: Containing particles of CaCO$_3$ (0.7 μm), SiO$_2$ (0.5 μm), and Al$_2$O$_3$ (0.1 μm) (the particle sizes relate to mean diameter).

Number of projections of from 200 to 400 nm at the back surface: 1515

Number of projections of 400 nm or higher at the back surface: 612.

EXAMPLE 2

By following the same procedure as Example 1 except that the content of carbon black in the lower magnetic layer was changed to 6 parts, a video tape was prepared.

EXAMPLE 3

By following the same procedure as Example 1 except that the content of carbon black in the lower magnetic layer was changed to 25 parts, a video tape was prepared.

EXAMPLE 4

By following the same procedure as Example 1 except that the content of carbon black in the lower magnetic layer was changed to 30 parts, a video tape was prepared.

EXAMPLE 5

By following the same procedure as Example 1 except that a polyethylene terephthalate $A_2$ having 2010 projections of from 200 to 400 nm and 700 projections of 400 nm or higher was used as the support in place of the polyethylene terephthalate $A_1$, a video tape was prepared.

EXAMPLE 6

By following the same procedure as Example 1 except that a polyethylene terephthalate $A_3$ having 1050 projections of from 200 to 400 nm and 450 projections of 400 nm or higher was used as the support in place of the polyethylene terephthalate $A_1$, a video tape was prepared.

EXAMPLE 7

By following the same procedure as Example 1 except that a polyethylene terephthalate $A_4$ having 1030 projections of from 200 to 400 nm and 300 projections of 400 nm or higher was used as the support in place of the polyethylene terephthalate $A_1$, a video tape was prepared.

EXAMPLE 8

By following the same procedure as Example 1 except that the content of carbon black in the upper magnetic layer was changed to 5 parts, a video tape was prepared.

COMPARATIVE EXAMPLE 1

By following the same procedure as Example 1 except that the content of carbon black in the lower magnetic layer was changed to 1 part, a video tape was prepared.

COMPARATIVE EXAMPLE 2

By following the same procedure as Example 1 except that the content of carbon black in the lower magnetic layer was changed to 1 part and the content of carbon black in the upper magnetic layer was changed to 15 parts, a video tape was prepared.

COMPARATIVE EXAMPLE 3

By following the same procedure as Example 1 except that the lower magnetic layer only (single layer) was formed, a video tape was prepared.

COMPARATIVE EXAMPLE 4

By following the same procedure as Example 1 except that the upper magnetic layer only (single layer) was formed, a video tape was prepared.

COMPARATIVE EXAMPLE 5

By following the same procedure as Example 1 except that a polyethylene terephthalate film B containing $CaCO_3$ (0.7 $\mu$m) and $SiO_2$ (0.5 $\mu$m) was used as the support in place of the polyethylene terephthalate $A_1$, a video tape was prepared.

COMPARATIVE EXAMPLE 6

By following the same procedure as Example 1 except that a polyethylene terephthalate film C containing $CaCO_3$ (0.7 $\mu$m) and $Al_2O_3$ (0.05 $\mu$m) was used as the support in place of the polyethylene terephthalate $A_1$, a video tape was prepared.

COMPARATIVE EXAMPLE 7

By following the same procedure as Example 1 except that a polyethylene terephthalate film D containing $CaCO_3$ (0.7 $\mu$m) was used as the support in place of the polyethylene terephthalate $A_1$, a video tape was prepared.

COMPARATIVE EXAMPLE 8

By following the same procedure as Example 1 except that a polyethylene terephthalate E containing no filler was used as the support in place of the polyethylene terephthalate $A_1$, a video tape was prepared.

COMPARATIVE EXAMPLE 9

By following the same procedure as Example 1 except that a polyethylene terephthalate film F containing $CaCO_3$ (1.0 $\mu$m), $SiO_2$ (1.0 $\mu$m), and $Al_2O_3$ (0.05 $\mu$m) and having 600 projections of from 200 to 400 nm and 1,500 projections of 400 nm or higher, a video tape was prepared.

COMPARATIVE EXAMPLE 10

By following the same procedure as Example 1 except that a polyethylene terephthalate film G containing $CaCO_3$ (0.05 $\mu$m), $SiO_2$ (0.05 $\mu$m), and $Al_2O_3$ (0.1 $\mu$m) and having 300 projections of from 200 to 400 nm and 150 projections of 400 nm or higher at the back surface was used as the support in place of the polyethylene terephthalate $A_1$, a video tape was prepared.

COMPARATIVE EXAMPLE 11

By following the same procedure as Example 1 except that a back coating layer containing carbon black was formed on the back surface, a video tape prepared.

EXAMPLE 9

By following the same procedure as Example 1 except that the following non-magnetic particle was used in place of the cobalt-modified magnetic particle in the lower magnetic layer, a video tape was prepared.

$TiO_2$ (crystalline rutile):
 Mean primary particle size: 0.035 $\mu$m
 $S_{BET}$: 40 m$^2$/g
 pH 7
 Content of $TiO_2$: 90% or more
 DPB oil absorption: 27 to 38 g/100 g
 Surface treating agent: $Al_2O_3$ Each of the video tapes prepared in the above examples and the comparison examples was evaluated.

The evaluation methods are described below. 1) Measurement of the Number of Projections on Support Surface:

The number of the projections was measured by a non-contact type surface roughness tester, "HIPOSS" (trade name, made by Kosaka Kenkyusho K.K.) at a cut-off value of 0.08 mm, and 70% of the cross-sectional area formed by slicing the base surface with a plane parallel with the mean central line was defined as the standard surface and the height of the projection from the standard surface was employed as the height of the projection.

2) Surface Electric Resistance of Magnetic Layer:

The surface electric resistance was measured by a digital surface electric resistance meter, TR-8611A (trade name, made by Takeda Riken K.K.) under the following conditions.

Measurement Condition: 23° C., 70% RH
Width and Length of Sample: e,fra 1/2× inch×e,fra 1/2× inch 3) Friction Coefficient ($\mu_1$) of Metal Guide (metal guide: SUS 305):

The back surface of a sample was brought into contact with the metal guide pin at a tension ($T_1$) of 50 g and a winding angle of 180° and a tension ($T_2$) required for running the sample at a speed of 330 mm/sec. was measured. The measuring circumstance was 23° C. and 70% RH.

From the measured value, the friction coefficient $\mu_1$ was calculated based on the following formula:

$$\mu_1 = 1/\pi ln(T_2/T_1)$$

4) Friction Coefficient ($\mu_2$) of Resin Guide (resin guide: POM (Duracon M207)):

By the same manner as 3) above using a resin guide in place of the metal guide, $\mu_2$ was calculated.

5) Abrasion by Metal Guide:

After 500 paths in state 3), the abrasions on the back surface were observed and evaluated as follows.
G: Good (almost no abrasion)
M: Fairly Good (limited abrasion)
B: Bad (extensive abrasion)
BB: Very Bad 6) Abrasion by Resin Guide:

After 500 paths in state 4), the abrasions on the back surface were observed and evaluated as follows.
G: Good (almost no abrasion)
M: Fairly Good
B: Bad
BB: Very Bad 7) Increase of Drop Out (DO):

After measuring DO (15$\mu$) (initial DO), DO after repeating 100 paths of FF to REW by a VHS type video tape recorder, NV8200 (trade name, made by Matsushita Electric Industrial Co., Ltd.), and the difference of the DO from the initial DO was defined as the increase of DO.

8) Electromagnetic Properties:

A standard signal was recorded and reproduced by a VHS type video tape recorder, NV8200 (trade name, made by Matsushita Electric Industrial Co., Ltd.) and the noise was measured by a noise meter, 925C (trade name, made by Shibasoku K.K.). The property of a standard sample was defined as 0 dB and S/N of each sample was obtained.

The results obtained are shown in Table 1.

TABLE 1

| Sample No. | 1st Layer Carbon Black | 1st Layer Rs (Single Layer) ($\Omega$/sq) | 2nd Magnetic Layer Carbon Black | 2nd Magnetic Layer Rs (Single Layer) ($\Omega$/sq) | Whole Layer Rs ($\Omega$/sq) | Polyethylene Telephthalate Support Inorganic Particle/Size ($\mu$m) CaCO$_3$ | SiO$_2$ | Al$_2$O$_3$ | Protrusions (number/0.1 mm$^2$) 200 to 400 nm | 400 nm≦ |
|---|---|---|---|---|---|---|---|---|---|---|
| Example 1 | 15 | $5 \times 10^6$ | 1 | $1 \times 10^{10}$ | $5 \times 10^7$ | 0.7 | 0.5 | 0.1 | 1515 | 612 |
| Example 2 | 6 | $7 \times 10^7$ | 1 | $1 \times 10^{10}$ | $7 \times 10^8$ | 0.7 | 0.5 | 0.1 | 1515 | 612 |
| Example 3 | 25 | $1 \times 10^4$ | 1 | $1 \times 10^{10}$ | $1 \times 10^5$ | 0.7 | 0.5 | 0.1 | 1515 | 612 |
| Example 4 | 30 | $6 \times 10^3$ | 1 | $1 \times 10^{10}$ | $3 \times 10^4$ | 0.7 | 0.5 | 0.1 | 1515 | 612 |
| Example 8 | 15 | $5 \times 10^6$ | 5 | $5 \times 10^6$ | $5 \times 10^7$ | 0.7 | 0.5 | 0.1 | 1515 | 612 |
| Comparative Example 1 | 1 | $5 \times 10^{10}$ | 1 | $1 \times 10^{10}$ | $5 \times 10^{10}$ | 0.7 | 0.5 | 0.1 | 1515 | 612 |
| Comparative Example 2 | 1 | $5 \times 10^{10}$ | 15 | $3 \times 10^6$ | $5 \times 10^9$ | 0.7 | 0.5 | 0.1 | 1515 | 612 |
| Example 1 | 15 | $5 \times 10^6$ | 1 | $1 \times 10^{10}$ | $5 \times 10^7$ | 0.7 | 0.5 | 0.1 | 1515 | 612 |
| Example 5 | 15 | $5 \times 10^6$ | 1 | $1 \times 10^{10}$ | $5 \times 10^7$ | 0.7 | 0.7 | 0.1 | 2010 | 700 |
| Example 6 | 15 | $5 \times 10^6$ | 1 | $1 \times 10^{10}$ | $5 \times 10^7$ | 0.7 | 0.5 | 0.05 | 1050 | 450 |
| Example 7 | 15 | $5 \times 10^6$ | 1 | $1 \times 10^{10}$ | $5 \times 10^7$ | 0.4 | 0.4 | 0.1 | 1030 | 300 |
| Comparative Example 5 | 15 | $5 \times 10^6$ | 1 | $1 \times 10^{10}$ | $5 \times 10^7$ | 0.7 | 0.5 | — | 1495 | 590 |
| Comparative Example 6 | 15 | $5 \times 10^6$ | 1 | $1 \times 10^{10}$ | $5 \times 10^7$ | 0.7 | — | 0.1 | 1310 | 550 |
| Comparative Example 7 | 15 | $5 \times 10^6$ | 1 | $1 \times 10^{10}$ | $5 \times 10^7$ | 0.7 | — | — | 1290 | 590 |
| Comparative Example 8 | 15 | $5 \times 10^6$ | 1 | $1 \times 10^{10}$ | $5 \times 10^7$ | — | — | — | 150 | 15 |
| Comparative Example 9 | 15 | $5 \times 10^6$ | 1 | $1 \times 10^{10}$ | $5 \times 10^7$ | 1.0 | 1.0 | 0.05 | 600 | *1500 |
| Comparative Example 10 | 15 | $5 \times 10^6$ | 1 | $1 \times 10^{10}$ | $5 \times 10^7$ | 0.5 | 0.05 | 0.05 | 300 | 150 |
| Comparative Example 3 | 15 | $5 \times 10^6$ | 1 | | $5 \times 10^6$ | 0.7 | 0.5 | 0.1 | 1515 | 612 |
| Comparative Example 4 | | | | $1 \times 10^{10}$ | $1 \times 10^{10}$ | 0.7 | 0.5 | 0.1 | 1515 | 612 |
| Comparative Example 11 | 15 | $5 \times 10^6$ | 1 | $1 \times 10^{10}$ | $5 \times 10^7$ | 0.7 | 0.5 | 0.1 | 1515 | 612 |
| Example 9 | 15 | $5 \times 10^7$ | 1 | $1 \times 10^{10}$ | $7 \times 10^8$ | 0.7 | 0.5 | 0.1 | 1515 | 612 |

Electromagnetic

TABLE 1-continued

| Sample No. | Back-coat | Metal Guide μ1 | Abra-sion | Resin Guide μ2 | Abra-sion | DO Increase (number/min) | proper-ties Y-S/N (dB) |
|---|---|---|---|---|---|---|---|
| Example 1 | — | 0.20 | G | 0.23 | G | 10 G | 2.7 G |
| Example 2 | — | 0.20 | G | 0.23 | G | 12 G | 2.8 G |
| Example 3 | — | 0.20 | G | 0.23 | G | 5 G | 2.5 G |
| Example 4 | — | 0.20 | G | 0.23 | G | 6 G | 2.2 M |
| Example 8 | — | 0.20 | G | 0.23 | G | 10 G | 2.0 M |
| Comparative Example 1 | — | 0.21 | G | 0.23 | G | 45 M | 2.8 G |
| Comparative Example 2 | — | 0.21 | G | 0.22 | G | 10 G | 1.4 B |
| Example 1 | — | 0.20 | G | 0.23 | G | 10 G | 2.7 G |
| Example 5 | — | 0.19 | G | 0.17 | G | 9 G | 2.6 G |
| Example 6 | — | 0.21 | G | 0.25 | G | 12 G | 2.9 G |
| Example 7 | — | 0.22 | G | 0.23 | G | 15 G | 3.0 G |
| Comparative Example 5 | — | 0.28 | M | 0.29 | B | 100 B | 2.6 B |
| Comparative Example 6 | — | 0.36 | B | 0.25 | M | 80 B | 2.7 B |
| Comparative Example 7 | — | 0.39 | B | 0.30 | B | 120 B | 2.7 B |
| Comparative Example 8 | — | 0.45 | BB | 0.48 | BB | 300 B | 3.0 B |
| Comparative Example 9 | — | 0.18 | G | 0.20 | M | 25 M | 2.0 B |
| Comparative Example 10 | — | 0.41 | B | 0.44 | BB | 200 B | 3.0 B |
| Comparative Example 3 | — | 0.21 | G | 0.22 | G | 9 G | 1.1 B |
| Comparative Example 4 | — | 0.21 | G | 0.23 | G | 40 M | 2.7 B |
| Comparative Example 11 | coated | 0.20 | G | 0.39 | B | 10 G | 2.9 B |
| Example 9 | — | 0.20 | G | 0.23 | G | 12 G | 2.9 G |

*No. of projection of at least 700 nm was 80/0.1 mm² and in other samples, No. of projections of at least 700 nm was less than 15/0.1 mm².

From the results shown in Table 1, the following observations are made.

(1) Effects on Surface Electric Resistance (Rs):

When Rs of the entire magnetic layers was within the scope of the present invention, the increase of DO was reduced and the electromagnetic properties were good. (Examples 1 to 3). When Rs was outside the scope, the increase of DO was extreme and was level B at $5 \times 10^9$ Ω/sq. (See Comparative Examples 1 and 2).

When Rs of the entire magnetic layers was lowered by lowering Rs of the 1st layer, the electromagnetic properties were better than in the case of lower Rs for the 2nd layer, and, hence, it was desirable to lower Rs by lowering Rs of the 1st layer. (See Examples 1 and 8).

When Rs of the 1st layer was $6 \times 10^3$ Ω/sq (carbon black 30 parts), the electromagnetic properties were level M. The content of carbon black in the 1st layer is desirably not more than 30 parts. (See Example 4).

(2) Effects of Inorganic Particles and Surface Projections of Polyester Film:

The samples using the inorganic particles defined by the present invention and having the projections defined by the present invention were good in the metal guide μ value, the abrasions, the resin guide μ value, and the DO increase. In particular, the samples having a lesser number of projections of 400 nm or more had the good electromagnetic properties. (See Examples 1, 4, 5, 6, and 7).

The samples which did not contain the 3 different kinds of the inorganic particles in the support being used in the present invention were inferior in the metal guide μ value, the resin guide μ value, the abrasions, and the DO increase. (See Comparative Examples 5, 6, and 7).

The sample containing no inorganic particles had less projections and were inferior in the metal guide μ value, the resin guide μ value, abrasions, and the DO increase. (See Comparative Example 8).

When the $CaCO_3$ particles and the $SiO_2$ particles were larger than those defined in the present invention, the distribution of the projections was outside the scope of the present invention and Y-S/N was bad. (See Comparative Example 9).

When the $CaCO_3$ particles and the $SiO_2$ particles were smaller than those defined in the present invention, the distribution of the projections was also outside the scope of the present invention and the metal guide μ value, the resin guide μ value, the abrasions, and the D) increase were inferior. (See Comparative Example 10).

(3) Single Layer:

In the case of forming the 1st magnetic layer only of Example 1, the electromagnetic properties were inferior. (See Comparative Example 3).

In the case of forming the 2nd magnetic layer only of Example 1, the DO increase was inferior. (See Comparative Example 3).

(4) Back Coat Formed:

The resin guide μ value and the abrasions were inferior to the samples of the present invention. (See Comparative Example 11).

As described above, the magnetic recording medium of the present invention does not have a back coating layer and by increasing the number of fine projections on the surface of the non-magnetic support corresponding to the back surface of the medium, reducing the number of the rough projections, and lowering the surface electric resistance of the magnetic layer surface of the magnetic recording medium to not higher than $10^9$ Ω/sq, the magnetic recording medium of the present invention causes less increase of drop out (DO) and is excellent in the electromagnetic properties.

Also, when the magnetic recording medium of the present invention is loaded in a magnetic tape cassette equipped with resin guides, an increase of drop out and the deterioration of the electromagnetic properties are prevented.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising:
   a non-magnetic support having a first surface and a second surface;
   a lower layer on said first surface: and
   a magnetic layer on said lower layer, the magnetic layer having a surface electric resistance (Rs) of $10^9$ Ω/sq or less,
   wherein the non-magnetic support contains at least 3 different kinds of particles comprising (1) irregularly shaped particles having a mean particle diameter of from 0.3 to 0.8 μm, (2) particles having a mean particle diameter of 0.3 to 0.8 μm, and (3) particles having a mean particle diameter of not larger than 0.2 μm, said at least 3 different kinds of particles differing from each other in at least one property of mean particle diameter and Mohs' hardness, and the second surface of the magnetic recording medium has at least 1,000 projections per 0.1 mm$^2$ of surface area, said projections having a height of from 200 nm to 400 nm, but with the provisos that not more than 1,000 projections per 0.1 mm$^2$ of surface area are present having a height of from 400 nm to 700 nm and not more than 50 projections per 0.1 mm$^2$ of surface area are present having a height of 700 nm or more.

2. The magnetic recording mediumas in claim 1, wherein said at least three different kinds of particles include (1) particles having a mean particle diameter of from 0.3 to 0.8 μm and a Mohs' hardness of from 1 to 5, (2) inorganic particles having a mean particle diameter of from 0.3 to 0.8 μm and Mohs' hardness of at least 6, and (3) inorganic particles having a mean particle diameter of not larger than 0.2 μm and a Mohs' hardness of at least 6.

3. The magnetic recording medium as in claim 1 wherein the lower layer is a magnetic layer containing at least a ferromagnetic particle and a binder or a lower nonmagnetic layer containing a non-magnetic particle and a binder, and the coercive force of all magnetic layers in the magnetic recording medium is at least 650 Oe.

4. The magnetic recording mediumas in claim 2, wherein the particles having a mean particle diameter of from 0.3 to 0.8 μm and a Mohs' hardness of from 1 to 5 are $CaCO_3$ particles, the inorganic particles having a mean particle diameter of from 0.3 to 0.8 μm and a Mohs' hardness of at least 6 are $SiO_2$ particles, and the inorganic particles having a mean particle diameter of not larger than 0.2 μm and a Mohs' hardness of at least 6 are $Al_2O_3$ particles.

5. The magnetic recording medium as in claim 2, wherein said different kinds of particles are combined in a mixing ratio, by weight, of 5 to 30 for particles (1), 0.5 to 3.0 for particles (2), and 1 to 5 for particles (3).

6. A magnetic tape cassette comprising a tape running route formed by fixed guides or rotary guide rollers, wherein at least one of the fixed guides or rotary guides is formed of a resin material, and a magnetic recording medium comprising:
   a non-magnetic support having a first surface and a second surface;
   a lower layer on said first surface; and
   a magnetic layer on said lower layer, the magnetic layer having a surface electric resistance (Rs) of $10^9$ Ω/sq or less,
   wherein the non-magnetic support contains at least 3 different kinds of particles comprising (1) irregularly shaped particles having a mean particle diameter of from 0.3 to 0.8 μm, (2) particles having a mean particle diameter of 0.3 to 0.8 μm, and (3) particles having a mean particle diameter of not larger than 0.2 μm, said at least 3 different kinds of particles differing from each other in at least one property of mean particle diameter and Mohs' hardness, and the second surface of the magnetic recording medium has at least 1,000 projections per 0.1 mm$^2$ of surface area, said projections having a height of from 200 nm to 400 nm, but with the provisos that not more than 1,000 projections per 0.1 mm$^2$ of surface area are present having a height of from 400 nm to 700 nm and not more than 50 projections per 0.1 mm$^2$ of surface area are present having a height of 700 nm or more.

* * * * *